United States Patent [19]

van de Velde Keyser

[11] Patent Number: 5,648,034

[45] Date of Patent: Jul. 15, 1997

[54] PROCESS OF MAKING CUT, SHAPED BLANKS

[75] Inventor: Herbert Sybrant van de Velde Keyser, Lochristi, Belgium

[73] Assignee: Monsanto Company, St. Louis, Mo.

[21] Appl. No.: 445,611

[22] Filed: May 22, 1995

[30] Foreign Application Priority Data

Jun. 1, 1994 [EP] European Pat. Off. ............ 94870091

[51] Int. Cl.$^6$ ........................................... B29C 55/06
[52] U.S. Cl. ........................ 264/160; 264/288.4; 264/292
[58] Field of Search ............................... 264/160, 288.4, 264/291, 292

[56] References Cited

U.S. PATENT DOCUMENTS

| | | | |
|---|---|---|---|
| 2,933,759 | 4/1960 | Startzell | 425/403 |
| 3,019,475 | 2/1962 | Smith | 425/335 |
| 3,696,186 | 10/1972 | Stark et al. | 264/292 |
| 3,912,440 | 10/1975 | Koss et al. | 425/335 |
| 4,267,140 | 5/1981 | Meeker | 264/291 |
| 4,554,713 | 11/1985 | Chabal | 26/51 |
| 4,808,357 | 2/1989 | Bourcier et al. | 264/160 X |
| 5,071,601 | 12/1991 | Matsuda | 264/481 |

Primary Examiner—Leo B. Tentoni
Attorney, Agent, or Firm—Michael J. Murphy

[57] ABSTRACT

An apparatus and method for continuously stretching a web of thermoplastic sheet into an arcuate form of desired curvature for the manufacture of laminated windshields. The apparatus includes conventional heating rolls, but employs at least two adjustable multispoke pyramids, one hot setting pyramid and one cooling pyramid which are separated by a wall incorporating a folding bar. The method relates to the manufacture of cut shaped blanks wherein hot setting and cooling steps are physically separated. Residual snap back after hot setting is released prior to the cooling step.

4 Claims, 5 Drawing Sheets

PROCESS OF MAKING CUT, SHAPED BLANKS

BACKGROUND OF THE INVENTION

The invention relates to an apparatus and method for continuously stretching a web of thermoplastic sheet into an arcuate form of desired curvature for use in laminated windshields.

For the production of automobile windshields, in particular those with a tinted band along the upper side, it is desirable to stretch the originally straight web of, for example, polyvinylbutyral interlayer into a curved web that fits along the upper side of the windshield. This curved web is subsequently cut to produce the appropriate cut shaped blanks that will be used as interlayer between two sheets of glass for the manufacture of laminated windshields.

This stretching operation is done in an installation, commonly known as a "shaper", where the polyvinylbutyral web is first heated and then pulled onto either solid conical drums or onto an adjustable multi-spoke pyramid, sometimes referred to as the "umbrella" technology.

In the case of conical drums as, for example, disclosed in U.S. Pat. No. 5,071,601, several sets of drums are needed for obtaining different radii of the edges of the blanks. This implies a high number of change overs and will affect contamination levels and line capacity.

This "umbrella" technology is described in, for example, U.S. Pat. Nos. 2,933,759 and 3,696,186. The imprintations of the spokes on the sheet are usually negligible and are not considered as a problem.

This technology is particularly advantageous as the shape, i.e. the radius of curvature of the edges, may be easily varied by mechanically adjusting the opening of the umbrella, even while running.

According to the prior art, the hot polyvinylbutyral sheet is kept some time in its stretched form on the pyramid to allow the new shape to set. The setting is an exponential function that converges to 100% setting but will never attain this number.

After an acceptable setting has been achieved, the polyvinylbutyral sheet is cooled down while still on the pyramid to avoid distortion of the set shape when subsequently handling the hot soft sheet.

An undesired side effect of the cooling down is that it also freezes the remaining snap back in the sheet, which will be freed during the subsequent storage and during the lamination process.

It is an object of this invention to make available a method for producing shaped blanks having significantly improved dimensional stability.

It is another object of this invention to make available a shaping unit which can serve to produce shaped blanks having significantly improved dimensional stability.

The above and other objects can now be achieved with the aid of technology whereby the shaped blanks are first subjected to hot-setting followed by relaxation (or snapback) and subsequent cooling. In a preferred manner, such process is executed with the aid of at least two truncated (adjustable) multispoke pyramids.

DESCRIPTION OF THE INVENTION

This invention discloses a shaping process where the "hot setting" function and the "cooling" function are performed on separate conical drums.

One benefit is a more efficient operation because the setting pyramid, being separated from the cooling pyramid, may be placed in a more homogenous hot environment. Concurrently, the cooling operation is more efficient because of the homogeneously cold environment around the cooling pyramid.

According to one aspect of the invention, there is provided between the hot setting and cooling operations a "snap back" step that releases most of the remaining elastic strain of the shaped sheet prior to the cooling step. This will improve the dimensional stability of the cut shaped blanks.

In order to achieve the above step there is provided, between the hot setting conical drum or pyramid and the cooling drum or pyramid a path wherein the web is substantially allowed to recover some of its elastic strain.

This may be achieved by choosing a first conical drum with an increased included angle compared to the one of the second conical drum, the latter corresponding to the desired end radius of the cut shaped blanks. This will allow the sheet to relax slightly prior to the cooling step. Increased means numerically larger e.g. 15 angular degrees instead of 12 angular degrees.

The "included angle" is the apical angle of the truncated pyramid of the respective conical drums e.g. in FIG. 5 the angle between pyramid spokes 8.

According to another aspect of the invention the conical drums are two adjustable multispoke pyramids or umbrellas as referred to hereinbefore.

In a preferred embodiment, the radius of the hot setting pyramid is set slightly smaller, for example from 2% to 12% more preferably from 3% to 10%, as compared to the radius of the cooling pyramid. The radius stands for the radius of the (segment of the) circular curvature of the upper perimeter of the blank that follows the roofline of the car.

The second pyramid is the cooling pyramid. It has a number of air knives blowing cold air on the polyvinylbutyral sheet that rests on the pyramid to cool down the sheet. This pyramid is adjusted for the desired radius and therefore may let the remaining elastic strain snap back.

The polyvinylbutyral sheet is guided from the first pyramid onto the second pyramid by a folding bar with adjustable inclination. The inclination is a function of the setting of the apical angle of both pyramids.

The folding bar is preferably a steel bar that has multiple rollers mounted onto it side by side to accommodate the individual speeds of each section of the curved polyvinyl web.

Preferably the cold conical drum, solid or umbrella, is separate from the hot station and the hot setting conical drum contained therein by a wall comprising a slit for the passage of the curved sheet in a configuration of a "letter box slit".

BRIEF DESCRIPTION OF THE DRAWINGS

FIG. 6 is a view of the folding bar, partially shown in detail, provided between both pyramids;

FIG. 6a is an exploded view of a portion of the folding bar of FIG. 6 identified in FIG. 6 as 6a;

DETAILED DESCRIPTION OF THE INVENTION

Figure 1:
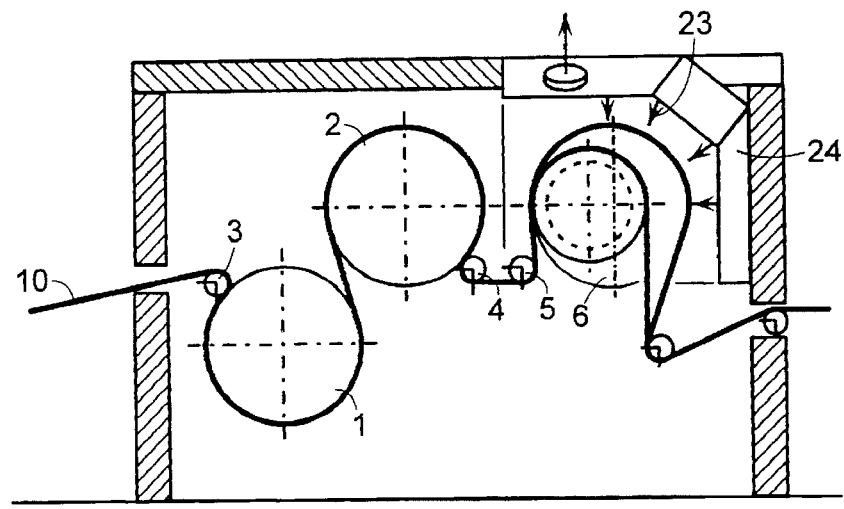
FIG. 1 is an elevation view of part of a manufacturing line according to the prior art, showing heating drums and a pyramid.

The invention will be more clearly understood from the following description of some preferred embodiments thereof, given by way of example only with reference to the above mentioned accompanying drawings.

The manufacturing line comprises an unwind stand for rolls up to 800 mm diameter, a splicing station and festoon and space for an inspection station.

The straight PVB sheet coming from the unwind stand, is typically of 0.76 mm thickness, and runs at a speed of 3 to 15 m/min, preferably 6 m/min. The sheet is fed to one or more~ consecutive cylindrical heating drums where it is gradually heated up to the shaping temperature. As known in the art, the heating drums are elongated horizontally and transversely to the movement of the sheet. The drums may be heated by any known system, including hot water and steam. The surface temperature of the heating drums will preferably lie between 80° and 140° C.

The number of heating drums is not limited. If desired the stretching apparatus may include 2 to 5 heating drums. Preferably each drum is driven by an individual servomotor.

As shown in FIGS. 1 to 4, which are elevation and plan views of the shaping unit according to prior art and according to the invention, the first and last heating drums 1 and 2 are associated with respective smaller free-rolling lay-on and take-off drums 3, 4, 5, which may or may not be heated separately.

Steam knives (not illustrated) may be provided on the line to compensate the moisture losses incurred at the heating drums.

The actual shaping or stretching of the web 10 takes place between the last heating or hot cylindrical drum 5 and the first hot conical drum 6 (being a solid drum or an umbrella). The cylindrical drum and the conical drum have individual drives to set the ratio for optimal shaping performance.

Ahead of the conical drum 6, a spreader roll (not illustrated) may be added to remove any wrinkles from the sheet which could appear during the shaping process.

Ideally, the orientation of the first conical drum 6 is such that the line of last contact of the sheet 10, with the lay-on cylindrical drum 5 and the line of first contact with the conical drum are preferably in the same plane. The actual stretching operation takes place between drum 5 and drum 6. The amplitude of the stretching increases from the edge of the web close to the smaller end of the conical drum in direction of the opposite edge. The stretching is due to the transverse difference of the speed of the web in this particular part of the shaping unit.

As previously set forth, the conical drum 6 may be a solid conical drum but is preferably a truncated multispoke pyramid.

In the latter preferred embodiment, as the orientation of the axes of the pyramids 6,7 are generally not adjustable, the direction of the line of first contact will vary accordingly to variations in the radii of pyramid 6. Consequently, in most cases the line of first contact with hot drum 6 will not be exactly in the same plane as the line of last contact on drum 5.

Figure 5:
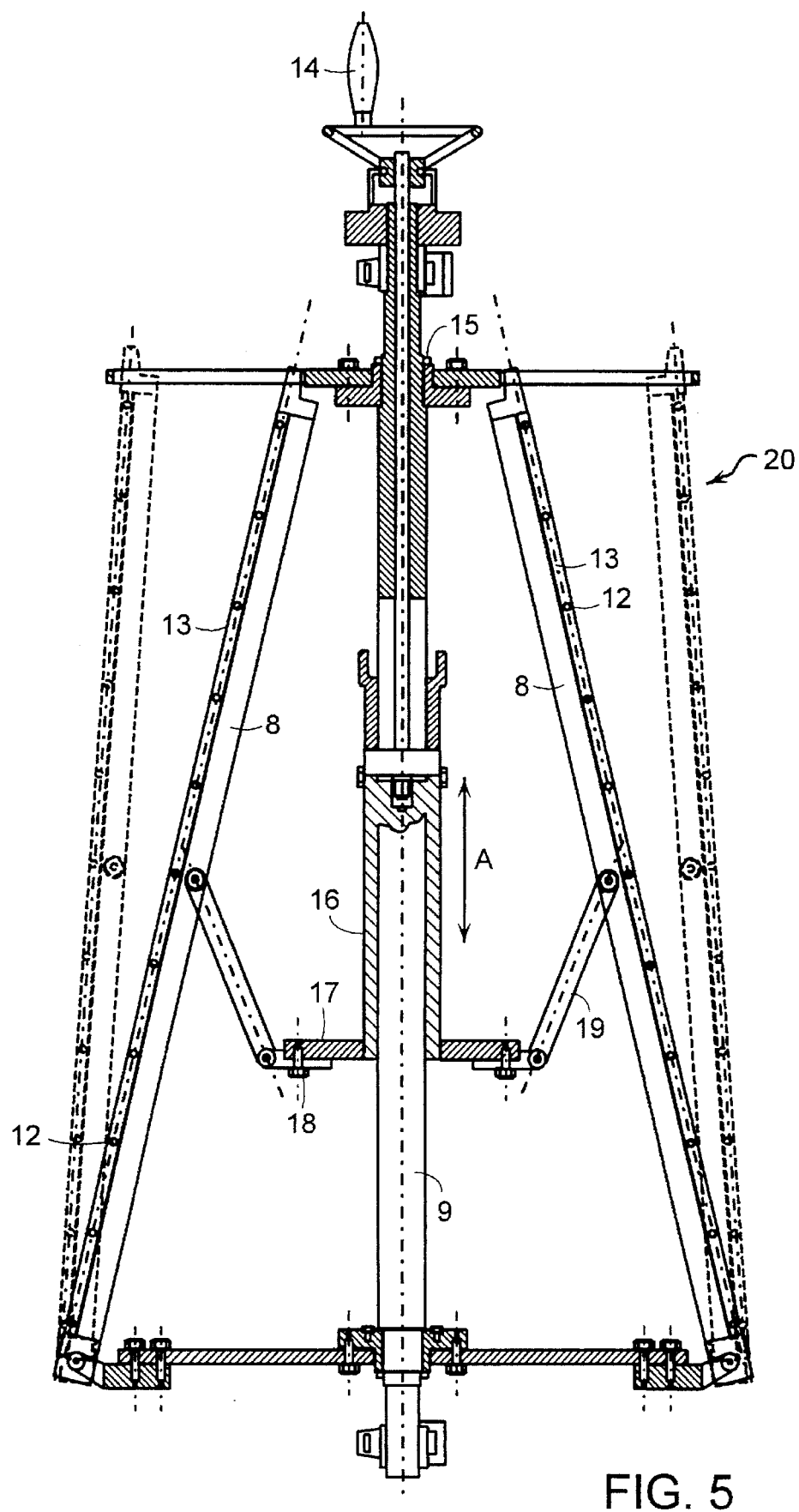
FIG. 5 is a sectional view of a pyramid as used according to the apparatus and the method of the invention.

As shown in FIG. 5 the pyramid 6 or 7 comprises elongate members 8 disposed around a main shaft 9, forming an assembly reminiscent of a truncated umbrella, with spokes radiating from a central main shaft. Each spoke or member 8 is provided on each side with two support means 13 fixed by means of screws 12. These support members are in the form of slats 13 which are in contact with the moving thermoplastic sheet. These slats 13 also provide sufficient traction on the sheet for the shaping operation.

The adjustment of the included angle of the pyramids 6,7 may be actuated by a gear motor or a manual crank 14. This is achieved through a spindle 15 acting on a bushing 16 slidably received on the shaft 9. An annular disc 17 is provided at the end of the bushing, pivotally secured via pins 18 to a number of links 19 to the spokes. The operation of the spindle will result in the movement (arrow A) of the bushing 16 along the shaft, which will actuate the opening of the links and corresponding spokes permitting in this way the adjustment of the included angle of the pyramid. The open configuration 20 is illustrated in dotted lines.

The included angle may, for example, be adjusted to obtain radii from 1.8 to 8.0 meters.

The holding section of the sheet on drums 6,7 is generally between 140 and 220 (angular) degrees, preferably around 180 degrees, the total drum circumference being 360 degrees. There may be between 30 and 100 spokes, in one preferred embodiment around 60, on each drum.

Figure 2:
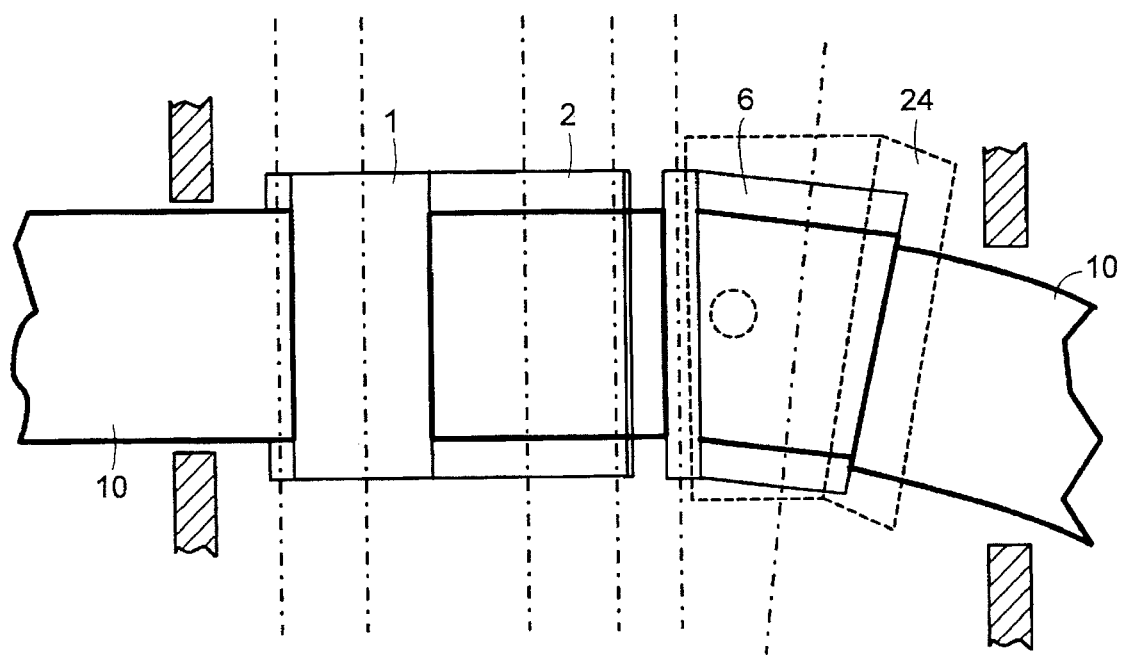
FIG. 2 is a plan view corresponding to FIG. 1.

FIGS. 1 and 2 show a configuration in elevation and plan view as known in the prior art. There is only one conical drum 6, being an umbrella, where the setting and cooling operation are taking place on respectively a first and second holding section. The cooling is achieved by means of air knives 23 provided on one side of the pyramid.

Figure 3:
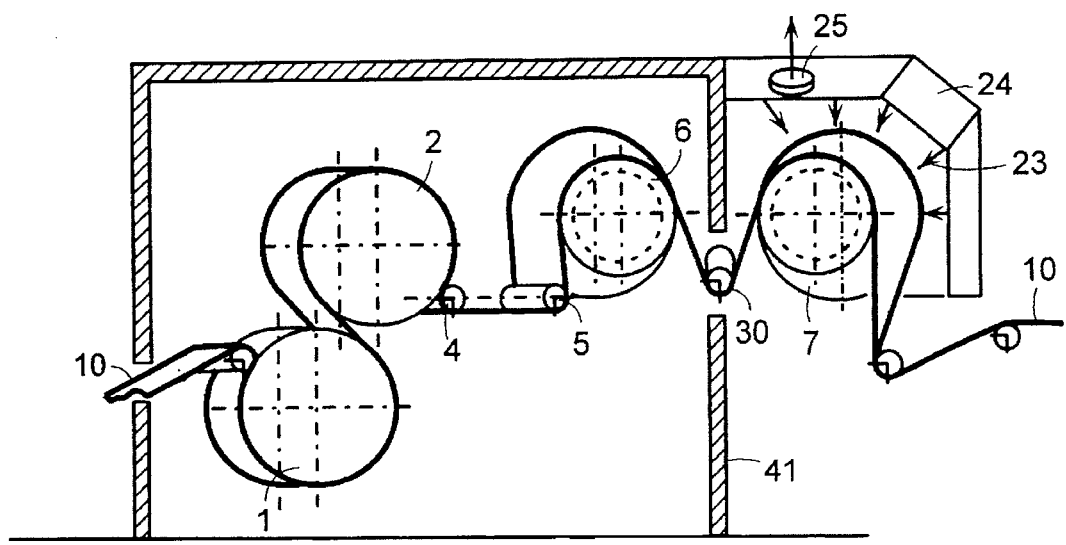
FIG. 3 is an elevation view of part of a manufacturing line in accordance with the invention, showing heating drums and two pyramids.
Figure 4:
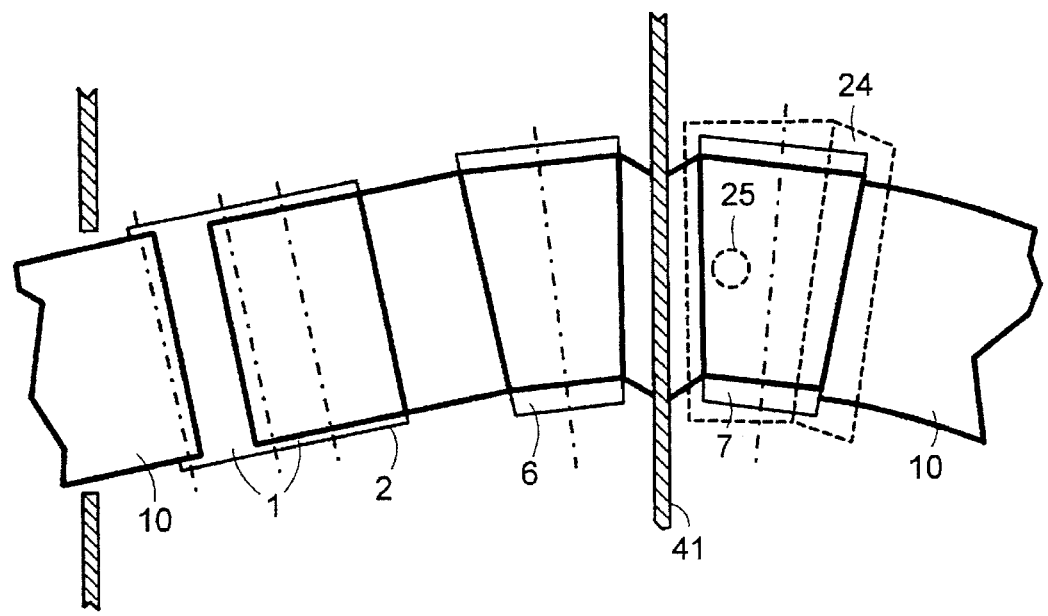
FIG. 4 is a plan view corresponding to FIG. 3.

According to the invention, as illustrated in FIGS. 3 and 4, there is provided at least a second conical drum 7.

The second conical drum 7 is separate from the first one and is also preferably a second adjustable multispoke pyramid, which can be identical in construction to the first one. Ideally it is the mirror image of the first conical drum 6.

In operation the apex of the second conical drum 7 will approximately coincide with the apex of the first conical drum 6.

The air knives 23 associated with the cooling conical drum 7 may follow mechanically the position of the umbrella spokes 8 when the included angle, and therefore the radius of the cut blanks, is changed. The air knives 23 are incorporated in a large suction hood 24 that collects the cooling air through an exit 25 for return to the cooler.

According to one important aspect of the invention there is provided a folding bar 30 in the path between the first 6 and second conical drum 7.

Figures 6, 6A:
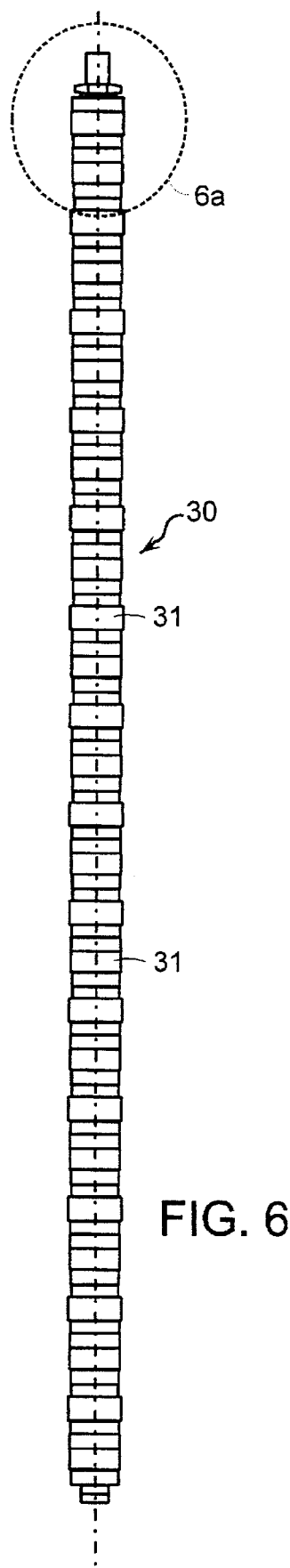

FIG. 6 is a view of such a folding bar 30, partially shown in detail in FIG. 6a. This bar comprises a number of rollers 31, preferably between 20 and 40, in order to adapt the different sectional speeds of the stretched sheet emerging from the first conical drum 6.

The encircled detail shows a fixing thread 32, the rollers 31 with the associated bearings 34, spaced by bushings 35 mounted onto the main shaft 36.

The orientation of bar 30 is such that its axis will also approximately cross the apex of both conical drums. When associated with an adjustable pyramid, the bar should therefore be able to pivot in the mirror plane between the symmetrical pyramids in order to accommodate a change of their openings.

According to another embodiment, the rollers 31 may also be in the form of truncated conical rollers.

Figure 7:
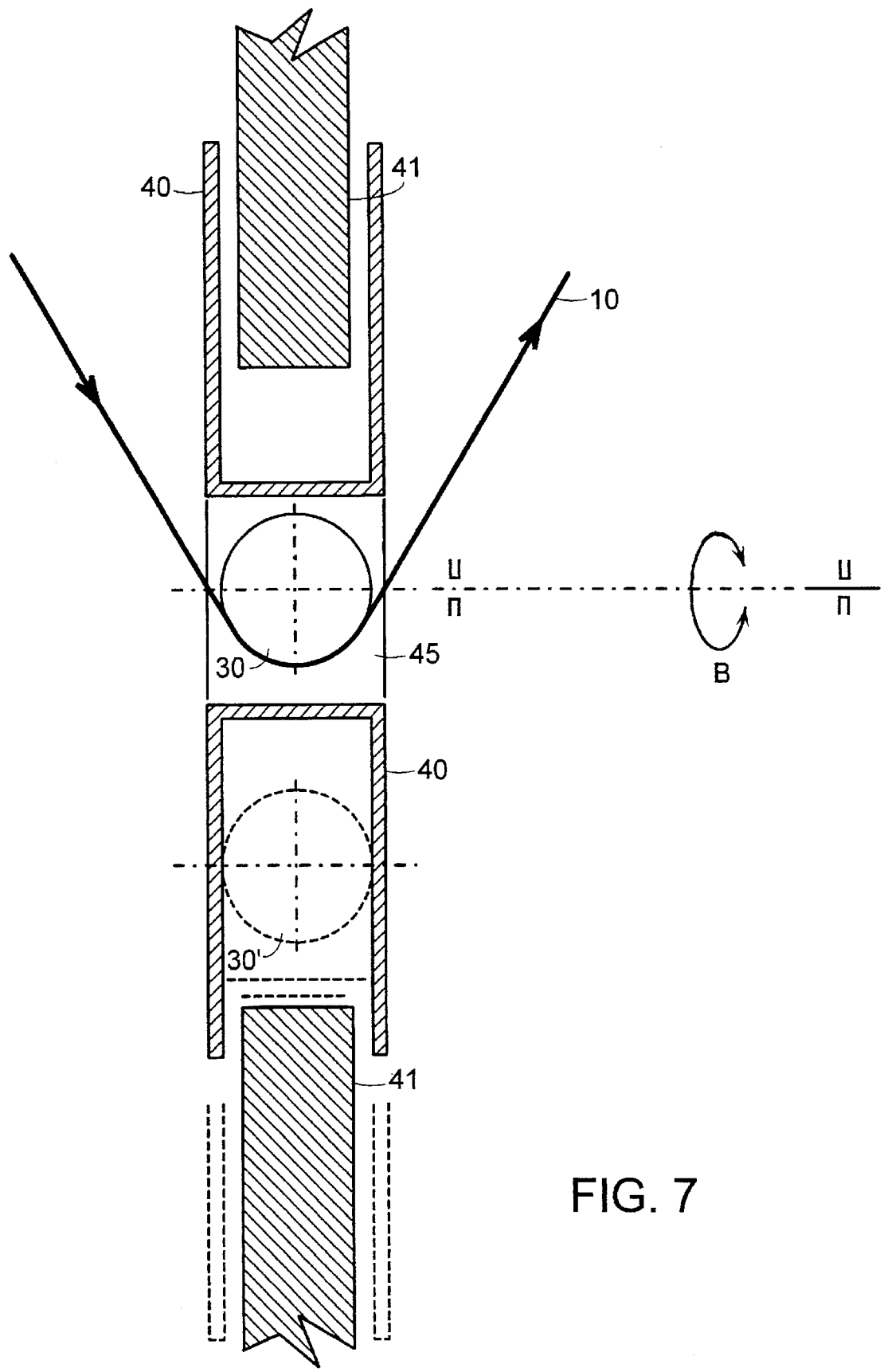
FIG. 7 is a sectional view of the wall separating both pyramids, with the letter box aperture for the passing sheet.

FIG. 7 illustrates a moving member 40 defining a slit 45 in the partitioning wall 41 which will preferably be provided between the hot holding station and the cooling station for the passage of the then curved sheet. This wall will be placed preferably parallel and around the above folding bar 30, 30'. The slit 40 is in a configuration comparable to a letter box slit and is possibly pivotal at the far end (arrow B) in order to accommodate any change in the inclination of the sheet due to different adjustment of the pyramids.

The second conical drum 7 is followed by a circular track, adapted to the radius of the curved web, comprising further stations, including preferably a first air cushion table, one or several cooling tables, and a cutting table in order to obtain and store the final cut shaped blanks.

I claim:

1. A method for producing cut shaped blanks of thermoplastic material which comprises:

unwinding a continuous length of thermoplastic material (10);

heating the thermoplastic material by passing it over one or more heating drums (1,2);

passing the resulting heated thermoplastic material over a first hot conical drum (6) thereby causing stretching and an elastic strain in at least part of the material;

passing the material over a folding bar (30) along a path permitting partial recovery of its elastic strain;

passing the material over a cooled second conical drum (7); and further cooling and cutting the resulting stretched material respectively in a cooling and cutting station.

2. A method according to claim 1 wherein the first conical drum is chosen with a radius from 2% to 12% smaller than the radius of the second drum.

3. A method according to claim 1 or 2 wherein the conical drums are adjustable multispoke truncated pyramids.

4. A method according to claim 3 wherein the thermoplastic material is plasticized polyvinyl butyral.

* * * * *